United States Patent
Eckert et al.

(10) Patent No.: US 7,574,609 B2
(45) Date of Patent: Aug. 11, 2009

(54) METHOD, DEVICE AND COMPUTER PROGRAM FOR DETECTING POINT CORRESPONDENCES IN SETS OF POINTS

(75) Inventors: Gerald Eckert, Barsinghausen (DE); Sönke Müller, Hannover (DE); Jürgen Bückner, Porta-Westfalica (DE); Martin Pahl, Hannover (DE)

(73) Assignee: NXP B.V., Eindhoven (NL)

( * ) Notice: Subject to any disclaimer, the term of this patent is extended or adjusted under 35 U.S.C. 154(b) by 150 days.

(21) Appl. No.: 10/533,515

(22) PCT Filed: Oct. 24, 2003

(86) PCT No.: PCT/IB03/04725

§ 371 (c)(1),
(2), (4) Date: May 2, 2005

(87) PCT Pub. No.: WO2004/042645

PCT Pub. Date: May 21, 2004

(65) Prior Publication Data

US 2006/0013452 A1   Jan. 19, 2006

(30) Foreign Application Priority Data

Nov. 5, 2002  (DE)  ................ 102 51 787

(51) Int. Cl.
*H04K 1/00*   (2006.01)

(52) U.S. Cl. ............... 713/186; 713/176; 382/124; 382/116

(58) Field of Classification Search ............... 713/176, 713/182, 186; 382/115, 124, 128, 116, 165, 382/190; 707/1–3, 6, 7, 104.1
See application file for complete search history.

(56) References Cited

U.S. PATENT DOCUMENTS 5,054,090 A * 10/1991 Knight et al. ............... 382/127
5,631,972 A    5/1997 Ferris et al.
5,761,330 A * 6/1998 Stoianov et al. ............. 382/127

\* cited by examiner

*Primary Examiner*—Kimyen Vu
*Assistant Examiner*—Nirav Patel

(57) ABSTRACT

A method, device and computer program for detecting point correspondences in sets of points and in particular for fingerprint verification. Points of note on fingerprint lines in a scanned fingerprint are compared with corresponding points of note on fingerprint lines in a reference fingerprint and matching pairs are formed from possible corresponding points of note in the scanned fingerprint and the reference fingerprint. A maximum number of such matching pairs is found. This allows an efficient method to be specified, for fingerprint verification for example, that requires only a small amount of working memory and computing power.

7 Claims, 3 Drawing Sheets

METHOD, DEVICE AND COMPUTER PROGRAM FOR DETECTING POINT CORRESPONDENCES IN SETS OF POINTS

The present invention relates to a method and device for detecting point correspondences between a first set of points and a second set of points. The present invention also relates to a computer program for a fingerprint verification device where correspondence is detected between a first set of points and a second set of points.

Methods of this kind are often used in biometric identification, such as in fingerprint verification for example. Over the past few years biometric identification has made great progress in the technical field relating both to the sensors and the analysis. Checks on the identities of persons by analyzing attributes that are peculiar to their bodies, i.e. biometric attributes, are performed with particular frequency by reference to fingerprints.

The intention may, for example, be for the identification of fingerprints to make access to security areas more secure but also easier. Systems of this kind become easier for the user because it is no longer necessary for him to carry a "key", be it in actual physical form or in the form of a PIN number. The use in addition of biometric attributes also produces a significant increase in security because it is almost impossible or at least difficult to steal a fingerprint for example and even a copy is hard to make.

To enable a person to be identified, characteristic attributes of this person (a set of reference data) are stored and, if access is requested, are compared with the data that becomes available at the time, which is scanned for example. Where identification is by fingerprints, it is usually points of note on fingerprint lines, so-called minutiae, that are used for verification. As well as a location, the minutiae may have assigned to them other properties such as, for example, a direction, a type or the appropriate security.

Minutiae can be thought of as feature points in a two-dimensional space. Hence the object set for the verification process is to check the match of two sets of feature points. The things that have to be borne in mind in this case are, for example, possible translations, rotations and scalings and also omissions or additions of minutiae in the two sets of points.

Nowadays, procedures of this kind are usually carried out on computers. To ensure high security, it is however necessary for there to be a large number of minutiae, which means that the matching of one minutia in the reference pattern with a corresponding minutia in the pattern scanned becomes a matter of great complexity. Systems of this kind require in particular a very high computing and storage performance because all the possible combinations of minutiae matches usually have to be initialized and analyzed.

It is an object of the present invention to make available an efficient way of detecting point correspondences between a first set of points and a second set of points that requires only low computing and storage performance.

In accordance with the invention, this object is achieved by a method for detecting point correspondences between a first set of points and a second set of points in which possible matching pairs comprising a point from the first set of points and a point from the second set of points are found and a maximum number of matching pairs is found.

In accordance with the present invention, possible matching pairs are formed from the sets of points, in fingerprint verification for example matching pairs from the minutiae of the reference fingerprint and of the fingerprint that is scanned. In accordance with the present invention, an attempt is made to find a number of matching pairs that is as close to a maximum as possible. Advantageously, the method according to the present invention minimizes the complexity of the matching, and hence the number of computing steps that have to be performed when it is carried out on a computer and the storage capacity that is required. What is particularly advantageous is that the present invention thereby makes possible mobile fingerprint verification, for example in a mobile, i.e. portable, fingerprint verification device that has available to it only limited memory and computing resources. Also, in the method according to the present invention, a random access memory that is available can be limited to a preset value without thereby restricting the functional capabilities that the method has in principle.

The method according to the invention can also be used in a very versatile manner and can be employed wherever two different sets of feature points have to be examined in a mapping-invariant manner for matches, or in other words have to be matched with one another. Possible areas of application are for example, though not exclusively, the verification and classification of fingerprints using minutiae, the analysis of point correspondences to allow camera parameters to be estimated, the analysis of point correspondences to allow the position and state of images to be recorded, the matching of pass points for the geo-referencing and geo-coding of remote sensing data, or an analysis of point correspondences in 3 D for the recording of the positions and attitudes of three-dimensional objects.

In one embodiment, two matching pairs at a time can also be combined into tuples, a list of tuples is compiled and a search tree is created on the basis of the tuples list. Also, an affine map is created for each tuple that maps the two points making up each matching pair onto one another. The combination into tuples, the sorting of tuples into a tuple list and the creation of a search tree on the basis of the tuple list make it possible for a number of matching pairs that is as close as possible to a maximum to be determined very quickly and efficiently without any working memory-imposed limitation having an adverse effect on the functional capability that the method has in principle.

In one embodiment, validity of tuples can also be checked to allow the large number of tuples to be sorted into the tuple list and valid tuples are assessed for their "cost". In particular, this advantageous embodiment makes it possible for invalid tuples to be sorted out at an early stage. By means of the cost assessment, an easy way of assessing the quality of the valid tuples is made available. In this way, the working memory required and the computing time required are significantly reduced in comparison with known methods.

In one embodiment, a matching result can also calculated on the basis of clustering. This enables the matching result to be calculated in a particularly easy and efficient way.

In another embodiment, a method of fingerprint verification whose performance is not limited by a working memory-imposed limitation and which is thus suitable even for mobile, i.e. portable for example, fingerprint verification.

Under further embodiments of the present invention a device is specified which, with a small working memory and limited computing performance allows point correspondences in two sets of points to be very efficiently detected. One particular embodiment specifies in an advantageous manner a fingerprint verification device that can for example be mobile, i.e. portable, and can be accommodated in for example a chip card, a mobile phone, a PDA or a similar mobile computer device.

A basic concept of the present invention may, for example, be that matching pairs are combined into tuples, the validity of tuples is checked and the valid tuples are assessed for costs.

These and other aspects of the invention are apparent from and will be elucidated with reference to the embodiments described hereinafter.

Figure 1:
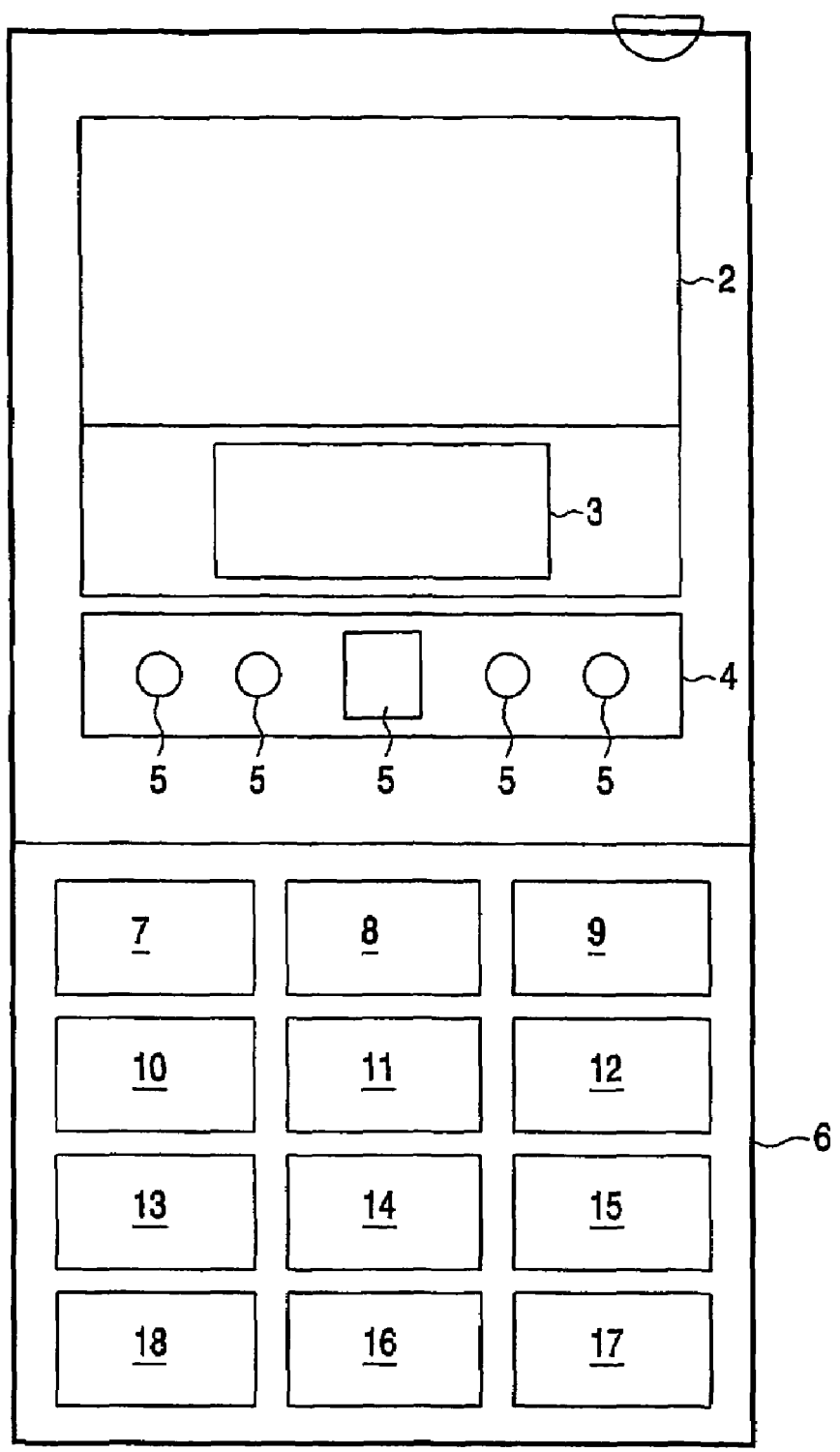
FIG. 1 shows a device for detecting point correspondences, for fingerprint verification for example, according to an embodiment of the present invention.

In what follows, an embodiment of a device according to the invention for detecting point correspondences between a first set of points and a second set of points will be described with reference to FIG. 1. The device, which is indicated in FIG. 1 by reference numeral 1, is a fingerprint verification device. A fingerprint verification device 1 of this kind can be implemented in the form of, for example, a portable handheld computer or PDA or a notebook. The fingerprint verification device 1 in FIG. 1 comprises a display 2 having a touch area 3 that is suitable for scanning a fingerprint of a finger, such as a person's thumbprint for example. The fingerprint verification device 1 further comprises an operating pad 4 having a plurality of keys 5 by which a fingerprint verification operation can be controlled. The fingerprint verification device 1 further comprises a processor means, such as, for example, a CPU, a working memory and an energy store or rechargeable battery to enable the fingerprint verification device to be operated without being dependent on a line supply. For reasons of clarity in FIG. 1, the processor means, the working memory and the energy storage means are not shown. In the case of the fingerprint verification device shown in FIG. 1, a housing cover has been taken off a lower region 6, so that other means belonging to the fingerprint verification device 1 that are situated in its interior can be seen. In this way, the fingerprint verification device 1 comprises a means 7 for finding possible matching pairs, a means 8 for combining matching pairs into tuples, a means 9 for checking a validity of the tuples, a means 10 for assessing the valid tuples by a cost function, a means 11 for compiling a list of tuples, a means 12 for creating a search tree, a means 13 for determining a match rate, a means 14 for forming a result space, a means 15 for determining a point, a means 16 for forming a cluster, and a means 17 for determining the matching result. Reference numeral 18 identifies a means for determining an affine map for each tuple that maps the two points making up each matching pair onto one another. The means 7 to 18 are in particular implemented in the processor means that is not shown. It is, however, also possible for the individual means 7 to 18 to be formed by suitably programmed EPLDs such as, for example, the EPLDs produced by the Altera company. The means 7 to 18 may also be implemented in the form of suitable software modules.

After a fingerprint has been scanned on the pad 3, the following three steps in particular are performed in the fingerprint verification device 1 shown in FIG. 1 by the means 7 to 17.

In a first step, a search is made for valid pairs of corresponding minutiae between the test pattern, namely the fingerprint that has been scanned, and a reference pattern that is stored in a memory in the fingerprint verification device 1. In other words, corresponding minutiae from the reference pattern and the test pattern are combined into pairs.

In a second step, these pairs are combined into tuples. A tuple comprises four minutiae, in which case two minutiae originate from the test pattern in each case and two from the reference pattern. The use of tuples comprising four minutiae advantageously makes it possible for use to be made of a cost function that assesses the quality of each tuple. At the same time, an associated affine map can be calculated for each tuple, which maps the two minutiae from the test pattern onto their possible correspondences in the reference pattern. In the fingerprint verification device 1 shown in FIG. 1, this affine mapping is calculated in the means 18. This will be described in more detail below by reference to FIGS. 3 and 4. The tuples found are then sorted into ascending order by cost and subjected to further processing.

In a third step, the tuples that have been sorted into ascending order by cost are combined by means of a search tree and a matching result is derived from this. The object is to find as many tuples as possible that are consistent with one another with a maximum of different pairs of corresponding minutiae, which is done by the following method.

Figure 2:
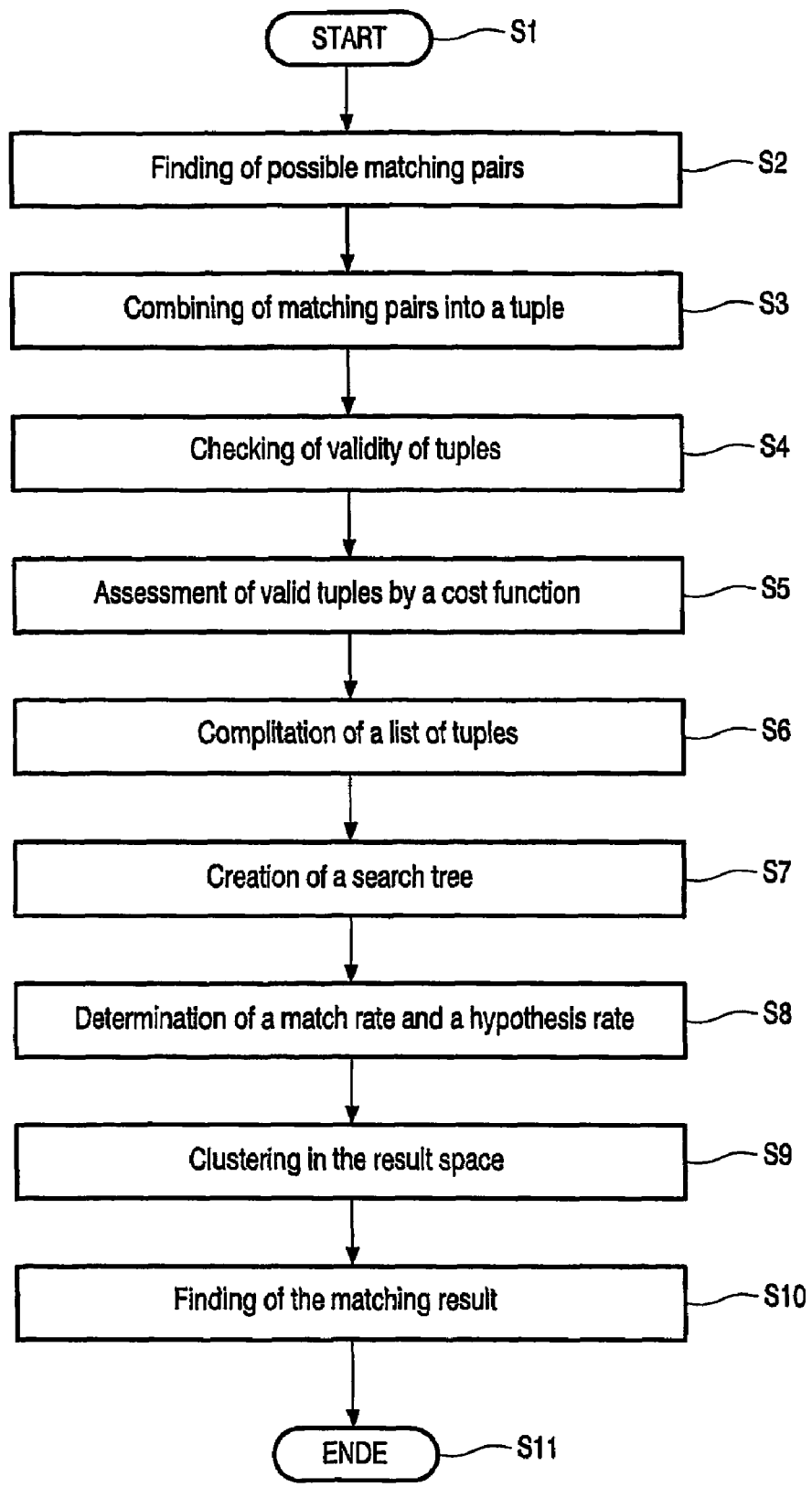
FIG. 2 shows a method of detecting point correspondences according to an embodiment of the present invention, to be carried out on, for example, the device of FIG. 1.

In what follows, there will be described by reference to FIG. 2 a method according to one embodiment of the present invention that can be carried out in, for example, the fingerprint verification device 1 shown in FIG. 1. After the start at step S1, the method goes on to step S2, in which possible matching pairs comprising a point from the fisst set of points, namely the test pattern, and a point from the second set of points, namely the reference pattern, are found. In the device shown in FIG. 1, this step is performed by the means 7.

After step S2, the method continues to the following steps S3 to S7, in which a maximum number of matching pairs is found.

In step S3, two matching pairs at a time are combined into a tuple to allow a plurality of tuples to be formed. In the device shown in FIG. 1 this step is performed by the means 8.

Then, in the next step S4, tuples that are valid are identified in the plurality of tuples by checking the plurality of tuples for validity. In the device shown in FIG. 1 this step is performed by the means 9.

For each tuple, an associated affine map is calculated that maps the two minutiae from the test pattern onto their possible correspondences in the reference pattern.

In the next step S5, the valid tuples are assessed by a cost function to allow the costs of the valid tuples to be determined. In the device shown in FIG. 1 this step is performed by the means 10.

In the next step S6, the valid tuples are sorted into a list of tuples, the valid tuples being sorted into this list by ascending cost. In the device shown in FIG. 1 this step is performed by the means 11. The method then goes on to step S7, in which a search tree is created on the basis of the tuple list. In the device shown in FIG. 1 this step is performed by the means 12.

In the next step S8, a match rate and a hypothesis rate are then determined. In the device shown in FIG. 1 this step is performed by the means 13. The method then goes on to step S9 in which a two-dimensional result space is formed where the match rate is entered along one dimension and the hypothesis rate along the second dimension and a corresponding point is thus defined in the result space. In the device shown in FIG. 1 this step is performed by the means 14. Clustering is then carried out in the result space, by means of a dividing line, for example. In the device shown in FIG. 1 this step is performed by the means 16.

In the next step S110, a matching result is found on the basis of the distance of the point from the dividing line. The matching result is given in this case by the distance, in the result space, of the point from the dividing line when converted to a value range of 0 to 1 and given a plus or minus sign. This step is performed in the device shown in FIG. 1 by the means 17. The method then goes on to step S11, at which it ends.

A further description will now be given of the method illustrated by the flow chart shown in FIG. 2. The description is divided into four sections, namely the forming of the pairs of minutiae, the compilation of the list of tuples, the search-tree-based matching and the result of the matching.

Forming of the Minutiae

As has already been indicated with reference to step S2, possible matches of minutiae (pairs of minutiae) are found from the two patterns (the test pattern and reference pattern). For this purpose, each minutia in the test pattern is compared with each minutia in the reference patter. For a valid pair of minutiae to be obtained, the following conditions have to be satisfied:

translation≦max translation, difference in directions of minutiae≦max. rotation+max. difference in directions of minutiae, types of minutiae must be the same.

The maximum translation and the maximum rotation are application-related requirements preset by the maximum permitted translation and rotation. The maximum difference in the directions of the minutiae is a threshold value (tolerance), below which two minutiae can be/are to be still considered as possible correspondences by reference to their directions. The types of minutiae are for example endings, branchings, core or delta.

Because all the pairs of minutiae previously assembled are hypothetical matches between minutiae in the test pattern and minutiae in the reference pattern, minutiae matches have to be confirmed or rejected by means of these three conditions, i.e. valid minutiae have to be separated from invalid ones. The minutiae in the test pattern will be abbreviated in what follows to lower-case letters (a, b, c . . . ) and the minutiae in the reference pattern to upper-case letters (A, B, C . . . ). Pairs of minutiae will be abbreviated below as follows (aA, aC, Ba, Cd . . . ), it being possible for minutiae in a pattern to occur in different pairs.

Compilation of the List of Tuples

As has already been indicated above with reference to step S3, the valid pairs of minutiae are combined into tuples each comprising two different pairs of minutiae. To ensure a consistent match, a minutia from a pattern is used only once per tuple when this is done. A tuple comprising four different minutiae is thus created. An example of a tuple is (aA|bB).

Since, in accordance with the present invention, four minutiae are combined into a tuple, it is possible to set up a cost function that constitutes a statement relating to the quality of the tuple. Also, an associated affine map can be calculated in this way for each tuple that maps the two minutiae in the test pattern onto their possible correspondences in the reference pattern. The mapping parameters are added to each tuple as an attribute.

Figure 3:
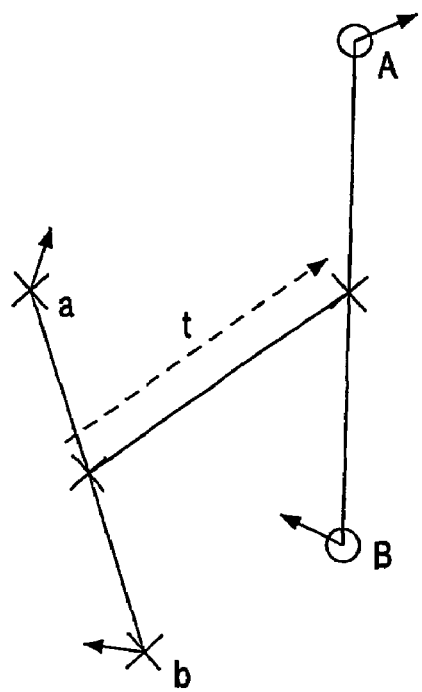
FIG. 3 shows two pairs of minutiae to allow the present invention to be elucidated.

FIG. 3 shows two pairs of minutiae, i.e. a possible tuple (aA|bB). The minutiae of the test pattern are represented by crosses in FIG. 3 and the minutiae of the reference pattern by circles. Also, the directions of the minutiae (the directions of tangents to the fingerprint lines at the minutiae) are indicated by arrows.

For the affine mapping, the translation t shown in FIG. 3 is calculated. The minutiae a,b of the test pattern are displaced in the direction of t so that the centers of the lines connecting the minutiae in the two patterns used in FIG. 2 coincide. Also, the two minutiae a, b in the test pattern are rotated about the center of the connecting line through the angle that is shown in FIG. 4 as "rot" (red), where rot<180°.

The rotated connecting line is thus aligned in the same direction as the line connecting the two minutiae in the reference pattern. The directions of the minutiae are thus co-rotated.

Figure 4:
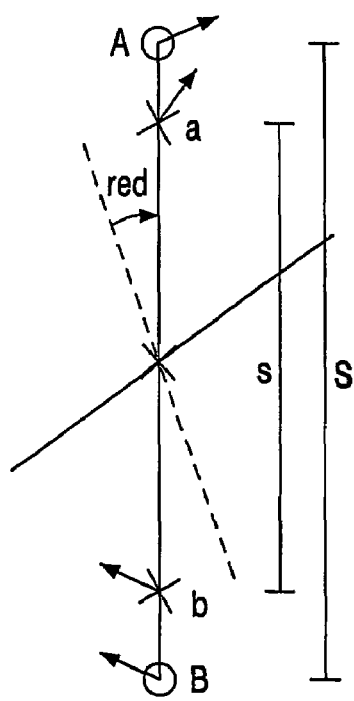
FIG. 4 shows two pairs of minutiae to allow the present invention to be elucidated.

The scaling of the affine mapping is then calculated, as can be seen from FIG. 4, from the ratio S/s of the lengths of the two connecting lines. The affine mapping parameters having been applied, the four minutiae from the two patterns are then superimposed on one another and the parameters of the affine mapping are known. Hence because the mapping parameters of the affine mapping are known, each tuple can be tested for its validity. For a tuple to be valid, the following conditions have to be satisfied:

translation t≦max. translation, rotation rot≦max. rotation,

|1-scaling|=|1-S/s|≦max. scaling, difference in minutiae directions≦max. difference in minutiae directions, difference in numbers of furrows between pairs of minutiae≦max difference in numbers of furrows.

As stated above, the max. rotation, max. translation, and max. difference in the directions of the minutiae are application-related, presettable requirements relating to the maximum rotation, maximum translation and maximum difference between the directions of the minutiae. The max. scaling is the application-related requirement laid down by the maximum permitted scaling. The number of furrows is the number of fingerprint lines (furrows) between the minutiae considered and the max. difference in the number of furrows is the application-related requirement represented by the maximum permitted difference in the number of furrows.

The tuples that meet these conditions are valid tuples. All the valid tuples are then assessed by a cost function. The cost function is calculated as follows:

Cost=alpha*translation t/max. translation+ beta*rotation rot/max. rotation+gamma*|1-scaling|/max. scaling+delta*diff. in directions of minutiae/max. diff. in directions of minutiae.

Alpha, beta, gamma and delta are weighting factors presettable by the user.

Subsidiary conditions that apply to these factors are:

0≦alpha, beta, gamma, delta≦1 alpha+beta+gamma+delta=1.

In line with the costs calculated, the valid tuples are then sorted in ascending order into a list whose length is limited to N tuples. This list is also referred to as a tuple list.

Search-Tree-Based Matching

The starting point for the construction of a search tree is the tuple list that has been sorted into ascending order by cost and that is of a maximum length N. The search tree is constructed by inserting tuples from the tuple list into the tree as nodes. A path from a root of the tree to a leaf represents a possible match of pairs of minutiae contained in the nodes/tuples. The object of the search is to find the highest attainable number of different pairs of minutiae composed of mutually consistent tuples, which number then represents the number of minutiae successfully matched between the test and reference patterns.

At each node of the tree, there is stored or noted as an attribute the number of different pairs of minutiae that are contained in the node/tuple in question and all the preceding nodes/tuples. Also stored at each node as a further attribute are the mean accumulated costs. The mean accumulated costs are calculated as the arithmetic means of the costs of the node/tuple in question and all the preceding nodes/tuples.

The search begins by inserting the tuple having the lowest costs into the tree as the first node. This is the tuple in the first position in the tuple list. The search tree is always taken forward at the leaf having the largest number of different pairs of minutiae. If there are leaves that have the same number of different pairs of minutiae, then the search tree is taken forward at the leaf that is lowest down in the tree. Where there are leaves having the same number of different pairs of minutiae that are the same distance down the tree, the search tree is taken forward from the leaf having the lowest mean accumulated costs. To extend the search tree at a leaf, there are two possible positions permitted for new nodes:

a new node at the same distance down, as a right-hand neighbor of the leaf in question, or a new node as a successor to the leaf in question.

At the possible positions for new nodes are inserted tuples having minimum costs, but whose costs are higher than those of the leaf in question, and that are thus situated at positions subsequent to that of the leaf in question in the tuple list. It is advantageously ensured in this way, in accordance with the present invention, that no combinations of tuples are contained more than once in different paths in the tree, thus making the method very efficient.

For each extending step, the following combinations of tuples are possible:

two new nodes comprising the same tuple (as the right-hand neighbor of and successor to the leaf in question)

two new nodes comprising different tuples (one as the right-hand neighbor of the leaf in question and one of higher costs as its successor)

one new node (as the right-hand neighbor of the leaf in question), or no new node.

The search tree is thus extended only by nodes whose tuple is consistent with all the preceding nodes and meets the following conditions for consistency:

the new node must be consistent with all its predecessor in respect of the pairs of minutiae contained in the tuples, i.e. there will be no multiple matches of minutiae in the two patterns, and the maximum difference in the mapping parameters of the tuples on a path must be less than fixed limiting values.

If a tuple cannot be inserted at a position that is to be occupied in the search tree due to failure to meet the consistency conditions, then the process continues with its successor from the tuple list having the next highest costs. The insertion of nodes causes the new nodes to become leaves on the tree, while the leaf considered previously loses its status as a leaf.

The construction of the search tree is advantageously continued in accordance with the present invention in the manner described until all the tuples from the tuple list have been used and hence no furter leaves can be inserted, or if the search tree has reached a limit on size to M nodes, where M is presettable.

Result of the Matching

The result of the matching is found from the search tree that has been constructed. The node having the largest number P of different pairs of minutiae that are contained in this node and all the preceding nodes (the result path) represents the best possible match of the two patterns having regard to the conditions laid down for validity and consistency and to the preset values for N and M. If N and M are selected to be sufficiently large, then the search constitutes a complete one in respect of the conditions for validity and consistency.

From the number P of matched minutiae (different pairs of minutiae), a matching rate can be calculated as follows:

Matching rate=$P$/min. minutiae from both patterns, where 0≦matching rate≦1.

In addition, all the P pairs of minutiae found are checked for mutual consistency by forming a tuple from them for all the combinations of two pairs of minutiae (matches) and checking it for validity under the validity conditions for the tuples. In this way, there is found the number H of valid tuples that can be interpreted as a hypothesis for the validity of the matching.

Hence, a hypothesis rate can be calculated as follows:

Hypothesis rate=($H$−min. possible tuples)/(max.−min. possible tuples), where 0≦hypothesis rate≦1, where the minimum and maximum of the possible tuples works out as:

max. possible tuples=$P*(P-1)/2$, min. possible tuples=Ceil ($P/2$).

Here, P is the number of matched minutiae and "Ceil" is a function that rounds up a value which is not a whole number to the next highest whole number.

The final matching result can be derived as a combination of the two values formed by the match rate and the hypothesis rate. For this purpose, a two-dimensional result space is formed from the two values. The match rate is entered along one dimension of the result space and the hypothesis rate along the second dimension. This gives a point. The final matching result can be found by means of a clustering operation. Simple clustering of the result space can be achieved by placing a dividing line in the result space. The matching result is then found from the distance, in the result space, of the point from the dividing line when converted to a value range of 0 to 1 and given a plus or minus sign.

If the matching result is above a presettable threshold value, the test pattern corresponds to the reference pattern, i.e. the fingerprint scanned corresponds to the reference fingerprint.

Because of the search strategy according to the present invention that is employed, it becomes possible for the best match of minutiae or features to be found very quickly. Because of the form of the data structure, the method is capable of functioning in principle even if the working memory available is restricted to a preset value. In this way, use in mobile or embedded systems that have only low computing power or a limited working memory is made possible in accordance with the present invention.

The invention claimed is:

1. A method of detecting point correspondences between a first set of points and a second set of points, comprising the following steps:

finding of possible matching pairs comprising a point from the first set of points and a point from the second set of points, and finding a maximum number of matching pairs, wherein the finding of a maximum number of matching pairs comprises the following steps:

combining of two matching pairs at a time into a tuple to
form a plurality of tuples,
determining an affine map for each tuple, that maps the
two points in each matching pair of the tuple onto one
another,
sorting of the plurality of tuples into a tuple list,
creating a search tree on the basis of the tuple list, and
deriving a matching result from the search tree;
wherein the point from the first set of points and the point
from the second set of points are each points of note on
fingerprint lines, the first set of points corresponding to
a scanned fingerprint, the second set of points corresponding to a reference fingerprint, the points of note on
the fingerprint lines in the scanned fingerprint allowing
to be matched with the points of note in the reference
fingerprint, and the method being a method of fingerprint verification in which the scanned fingerprint is
compared with the reference fingerprint.

2. A method as claimed in claim 1, wherein the sorting of the plurality of tuples into the tuple list comprises the following steps:
identifying valid tuples among the plurality of tuples by checking the plurality of tuples for validity,
assessing the valid tuples by a cost function to determine costs for the valid tuples,
sorting the valid tuples and sorting the valid tuples into the tuple list, the valid tuples being sorted into the tuple list in ascending order by cost.

3. A method as claimed in claim 1, further comprising the following steps:
determining a match rate and a hypothesis rate,
forming a two-dimensional result space in which the match rate is entered along a first dimension and the hypothesis rate along the second dimension, and
finding a point in the two-dimensional result space on the basis of the match rate and the hypothesis rate,
forming a cluster in the result space, and
finding a matching result on the basis of a distance of the point from the cluster.

4. A device for detecting point correspondences between a first set of points and a second set of points, comprising:
a processor for performing the steps of finding possible matching pairs comprising a point from the first set of points and a point from the second set of points, and
finding a maximum number of matching pairs, wherein the finding a maximum number of matching pairs comprises:
combining two matching pairs at a time into a tuple to form a plurality of tuples,
determining an affine map for each tuple, that maps the two points in each matching pair of the tuple onto one another,
sorting the plurality of tuples into a tuple list,
creating a search tree on the basis of the tuple list, and
determining a matching result from the search tree;
wherein the point from the first set of points and the point from the second set of points are each points of note on fingerprint lines, the first set of points corresponding to a scanned fingerprint, the second set of points corresponding to a reference fingerprint, the points of note on the fingerprint lines in the scanned fingerprint allowing to be matched with the points of note in the reference fingerprint, and the device being a mobile fingerprint verification device in which the scanned fingerprint is compared with the reference fingerprint.

5. A device as claimed in claim 4, wherein the sorting the plurality of tuples into a tuple list comprises:
a processor for performing the steps of identifying valid tuples among the plurality of tuples by checking the plurality of tuples for validity,
the valid tuples by a cost function to determine costs for the valid tuples, and
sorting the valid tuples and sorting the valid tuples into the tuple list, the valid tuples being sorted into the tuple list in ascending order by cost.

6. A storage media that stores a computer program for a fingerprint verification device, wherein point correspondences are detected between a first set of points and a second set of points, and wherein computer program code of the computer program, when executed by a processor, performs the following steps:
finding of possible matching pairs comprising a point from the first set of points and a point from the second set of points, and
finding a maximum number of matching pairs, wherein the finding of a maximum number of matching pairs comprises the following steps:
combining of two matching pairs at a time into a tuple to form a plurality of tuples,
determining an affine map for each tuple, that maps the two points in each matching pair of the tuple onto one another,
sorting of the plurality of tuples into a tuple list,
creating a search tree on the basis of the tuple list, and
deriving a matching result from the search tree;
wherein the point from the first set of points and the point from the second set of points are each points of note on fingerprint lines, the first set of points corresponding to a scanned fingerprint, the second set of points corresponding to a reference fingerprint, the points of note on the fingerprint lines in the scanned fingerprint allowing to be matched with the points of note in the reference fingerprint, and the method being a method of fingerprint verification in which the scanned fingerprint is compared with the reference fingerprint.

7. A method of detecting point correspondences between a first set of points and a second set of points, comprising the following steps:
finding of possible matching pairs comprising a point from the first set of points and a point from the second set of points, and
finding a maximum number of matching pairs, wherein the finding of a maximum number of matching pairs comprises the following steps:
combining of two matching pairs at a time into a tuple to form a plurality of tuples,
determining an affine map for each tuple, that maps the two points in each matching pair of the tuple onto one another,
sorting of the plurality of tuples into a tuple list,
creating a search tree on the basis of the tuple list, and
deriving a matching result from the search tree,
determining that the first set of points corresponds to the second set of points if the matching result is above a presettable threshold value,
using the matching result for biometric identification, and
outputting a result of the biometric identification to a display.

* * * * *